(12) United States Patent
Lu et al.

(10) Patent No.: US 7,222,396 B2
(45) Date of Patent: May 29, 2007

(54) ROBUST HINGE

(75) Inventors: Sheng-Nan Lu, Shulin (TW); Chung-Yu Lee, Shulin (TW); Ting-Hsien Wang, Shulin (TW)

(73) Assignee: Shin Zu Shing Co., Ltd, Shulin (TW)

( * ) Notice: Subject to any disclaimer, the term of this patent is extended or adjusted under 35 U.S.C. 154(b) by 255 days.

(21) Appl. No.: 11/076,297

(22) Filed: Mar. 9, 2005

(65) Prior Publication Data
US 2006/0200945 A1 Sep. 14, 2006

(51) Int. Cl.
*E05C 17/64* (2006.01)

(52) U.S. Cl. .............................. 16/340; 16/342; 16/330

(58) Field of Classification Search .................. 16/337, 16/340, 342, 338, 330, 303, 328; 361/680–682; 455/575.1; 248/917–921; 379/433.13
See application file for complete search history.

(56) References Cited

U.S. PATENT DOCUMENTS

| | | | |
|---|---|---|---|
| 6,154,925 A * | 12/2000 | Miura .......................... | 16/338 |
| 6,421,878 B1 * | 7/2002 | Kaneko et al. ................ | 16/330 |
| 6,757,940 B2 * | 7/2004 | Lu et al. ........................ | 16/330 |
| 6,813,813 B2 * | 11/2004 | Lu et al. ........................ | 16/342 |
| 6,862,779 B1 * | 3/2005 | Lu et al. ........................ | 16/340 |
| 6,948,217 B2 * | 9/2005 | Higano et al. ................ | 16/303 |
| 2006/0185126 A1 * | 8/2006 | Su ............................... | 16/340 |

* cited by examiner

*Primary Examiner*—Robert J. Sandy
*Assistant Examiner*—Michael J. Kyle
(74) *Attorney, Agent, or Firm*—Alan Kamrath; Kamrath & Associates PA

(57) ABSTRACT

A robust hinge has a redundant positioning capability, is mounted between a cover and a base and has a keyed pivot pin, a rotating leaf, a stationary leaf and a spacer assembly. The rotating leaf is attached to the keyed pivot pin and connects to the cover. The stationary leaf is mounted around the keyed pivot pin, connects to the base and has a primary stationary positioning element. The spacer assembly is mounted around the keyed pivot pin and has primary and secondary rotating positioning elements and a secondary stationary positioning element. Each stationary positioning element has a detent. Each rotating positioning element has a protrusion corresponding to the detent. The protrusions engage the detents to provide the redundant positioning capability to keep the cover form hitting the base. Two pairs of protrusions and detents provide the redundant positioning capability.

3 Claims, 5 Drawing Sheets

ROBUST HINGE

BACKGROUND OF THE INVENTION

1. Field of the Invention

The present invention relates to a hinge, especially to a robust hinge that has a redundant positioning capability.

2. Description of the Prior Arts

An appliance with a base and a cover has a hinge, for example notebook computers, foldable cellular phones, etc. The hinge is mounted between the base and the cover to open or close the cover by pivoting the hinge. To keep the cover from hitting the base, the hinge has a positioning capability. A conventional hinge has a stationary positioning element and a rotating positioning element. However, the stationary and rotating positioning elements rub against each other when the hinge is pivoted. The friction between the stationary and rotating positioning elements causes the stationary and rotating positioning elements to wear and break easily.

To overcome the shortcomings, the present invention provides a robust hinge that has a redundant positioning capability to mitigate or obviate the aforementioned problems.

SUMMARY OF THE INVENTION

The main objective of the present invention is to provide a robust hinge that provides a redundant positioning capability. The robust hinge is mounted between a cover and a base and has a keyed pivot pin, a rotating leaf, a stationary leaf and a spacer assembly. The rotating leaf is attached to the keyed pivot pin and connects to the cover. The stationary leaf is mounted around the keyed pivot pin, connects to the base and has a primary stationary positioning element. The spacer assembly is mounted around the keyed pivot pin and has primary and secondary rotating positioning elements and a secondary stationary positioning element. Each stationary positioning element has a detent. Each rotating positioning element has a protrusion corresponding to the detent. The protrusions engage the detents to provide the redundant positioning capability to keep the cover from hitting the base. Two pairs of protrusions and detents provide the redundant positioning capability.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
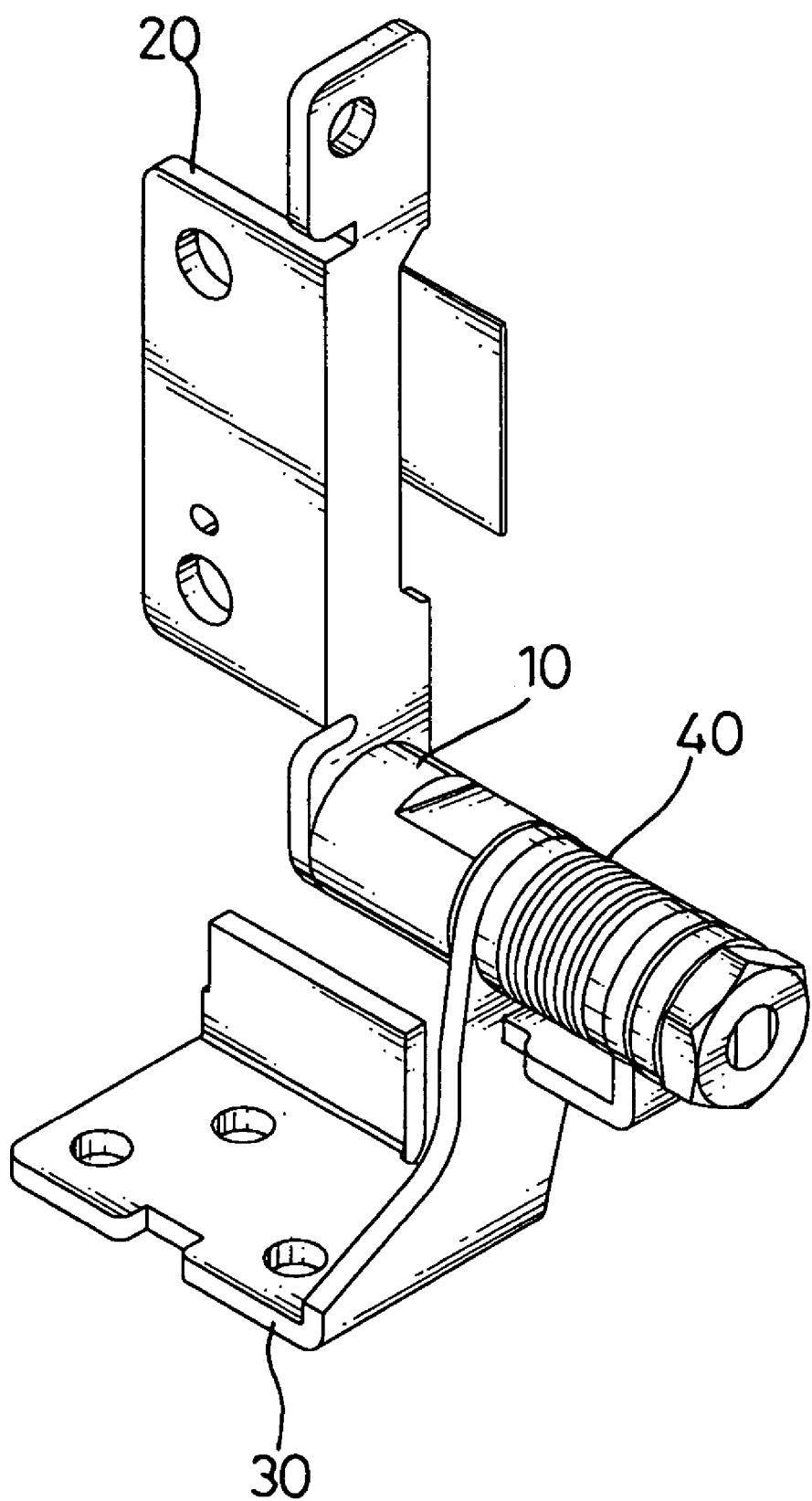
FIG. 1 is a perspective view of a robust hinge in accordance with the present invention.
Figure 2:
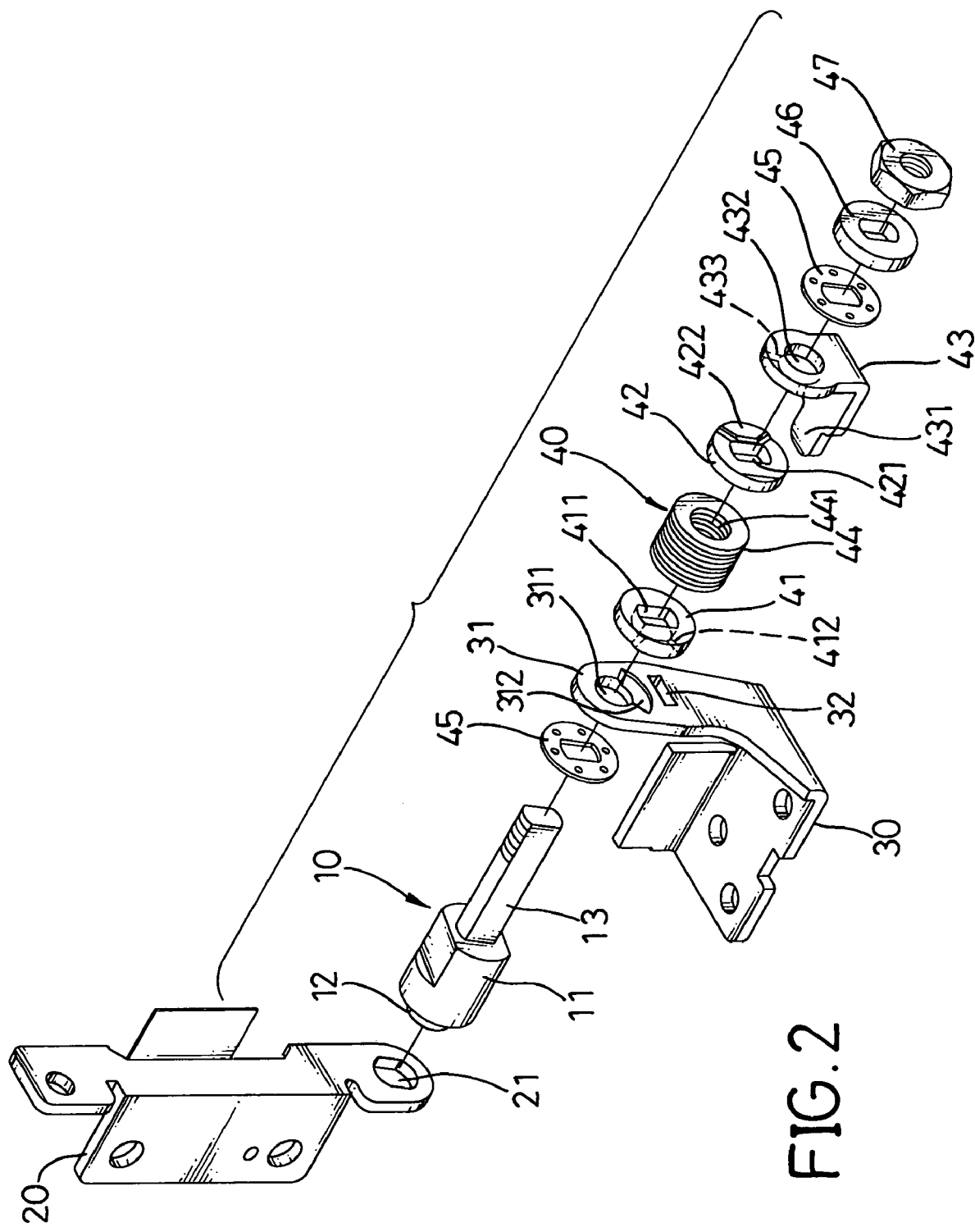
FIG. 2 is an exploded perspective view of the robust hinge in FIG. 1.

With reference to FIGS. 1 and 2, a robust hinge in accordance with the present invention comprises a keyed pivot pin (10), a rotating leaf (20), a stationary leaf (30) and a spacer assembly (40).

The keyed pivot pin (10) has an outer end, an inner end and a thread. The thread is formed on the inner end of the keyed pivot pin (10). In the preferred embodiment, the keyed pivot pin (10) has a head (11), a primary key (13) and a secondary key (12). The head (11) is formed near the outer end (12) of the keyed pivot pin (10) and has a diameter. The primary key (13) is formed on and extends out of the head (11) to be the inner end and has a diameter. The thread is formed on the primary key (13). The secondary key (12) is formed on and extends out of the head (11) to be the outer end and has a diameter. The diameter of the head (11) is larger than the diameters of the primary and secondary key (13, 12).

The rotating leaf (20) is attached securely to the outer end (12) of the keyed pivot pin (10) and has a through hole (21). The through hole (21) is attached around the outer end (12) of the keyed pivot pin (10), may be non-circular and may correspond to and may be mounted securely on the secondary key (12) of the keyed pivot pin (10).

The stationary leaf (30) is mounted around the primary key (13) on the keyed pivot pin (10) and has a primary stationary positioning element (31) and an optional mounting hole (32). The primary stationary positioning element (31) is formed on the stationary leaf (30) and has an inside surface, a central hole (311) and a detent (312). The detent (312) is formed in the inside surface of the primary stationary positioning element (31) around the central hole (311) and has two inclined ends. The mounting hole (32) is formed through the stationary leaf (30) near the detent (312).

The spacer assembly (40) is mounted around the primary key (13) of the keyed pivot pin (10) and has a primary rotating positioning element (41), a secondary rotating positioning element (42), a secondary stationary positioning element (43), a biasing member (44), multiple washers (45, 46) and a nut (47).

The primary rotating positioning element (41) is mounted on the primary key (13) of the keyed pivot pin (10), rotates with the keyed pivot pin (10) and has an outside surface, a central keyhole (411) and a protrusion (412). The outside surface of the primary rotating positioning element (41) abuts the inside surface of the primary stationary positioning element (31). The protrusion (412) is formed on the outside surface of the primary rotating positioning element (41) around the central keyhole (411), corresponds to and selectively engages the detent (312) in the primary stationary positioning element (31) and has two inclined ends.

The secondary rotating positioning element (42) is mounted on the primary key (13) of the keyed pivot pin (10) and has an inside surface, a central keyhole (421) and a protrusion (422). The protrusion (422) is formed on the inside surface of the secondary rotating positioning element (42) around the central keyhole (421) and has two inclined ends.

The secondary stationary positioning element (43) is L-shaped, is attached to the primary stationary positioning element (31), is mounted around the primary key (13) of the keyed pivot pin (10) and has a longitudinal leg and a transverse leg. The longitudinal leg is connected to the primary stationary positioning element (31) and has a proximal end, a distal end and an optional mounting tab (431).

The proximal end is connected to the primary stationary positioning element (31). The mounting tab (431) is formed on and protrudes longitudinally from the proximal end of the longitudinal leg and is mounted in the mounting hole (32) in the primary stationary positioning element (31). The transverse leg is formed on the distal end of the longitudinal leg, is mounted around the primary key (13) of the keyed pivot pin (10) and has an outside surface, a central hole (432) and a detent (433). The outside surface of the secondary stationary positioning element (43) abuts the inside surface of the secondary rotating positioning element (42). The detent (433) is formed in the outside surface of the secondary stationary positioning element (43) around the central hole (432), corresponds to and selectively engages the protrusion (422) on the secondary rotating positioning element (42) and has two inclined ends.

The biasing member (44) is mounted around the primary key (13) of the key pivot pin (10) between the primary and secondary rotating positioning elements (41, 42) and has a central hole (441).

The washers (45, 46) are mounted on the primary key (13) of the key pivot pin (10) to reduce the friction and may have keyed central holes.

The nut (47) screws onto the thread on the key pivot pin (10) to hold other elements of the spacer assembly (40) and the primary stationary positioning element (31) appropriately on or around the keyed pivot pin (10).

Figure 3:
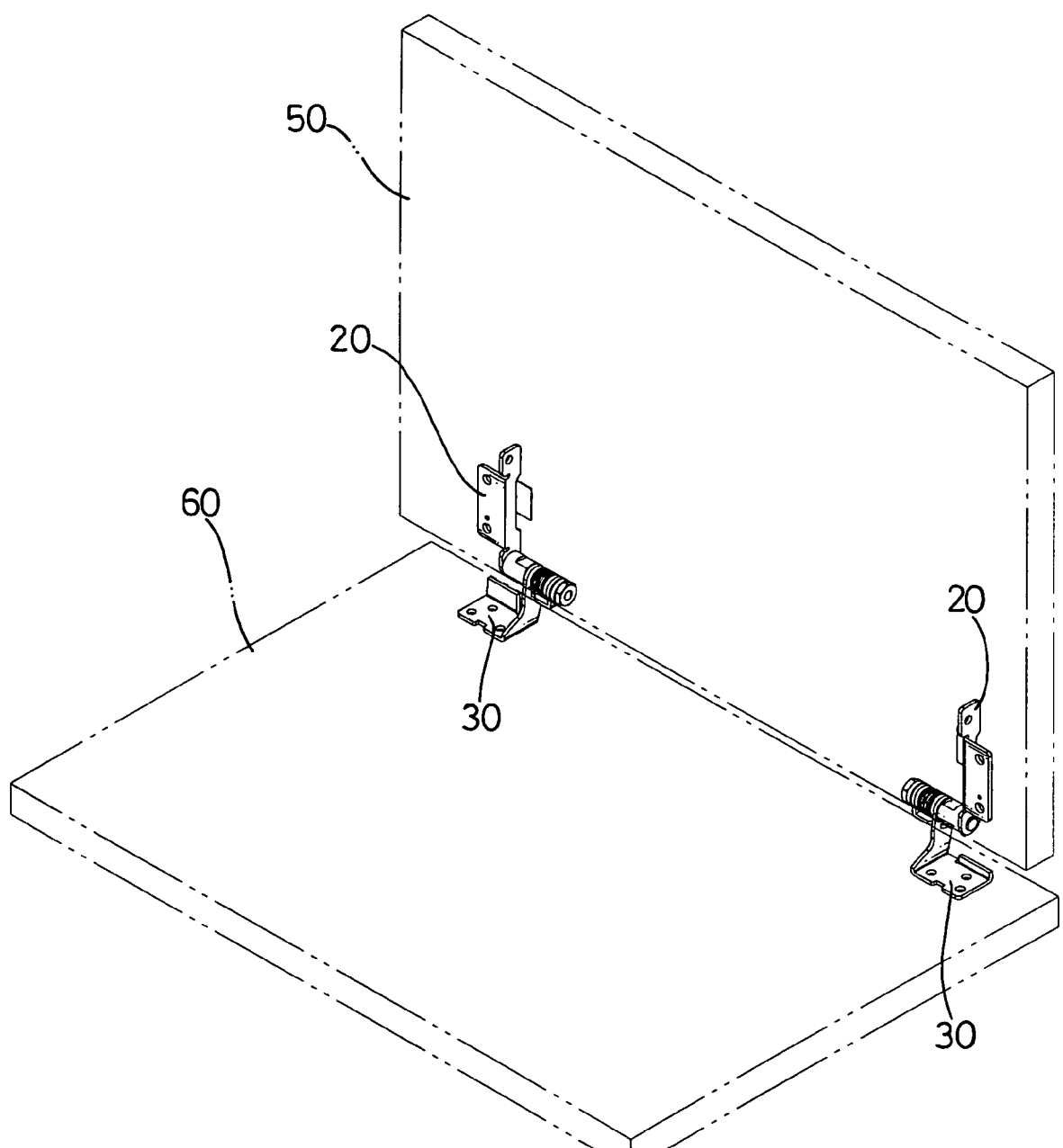
FIG. 3 is a perspective view of two robust hinges in FIG. 1 mounted on a notebook computer.

With further reference to FIG. 3, a notebook computer has a cover (50) and a base (60). Two robust hinges are mounted between the cover (50) and the base (60). The stationary leaf (30) connects to the base (60). The rotating leaf (20) connects to the cover (50).

Figure 4:
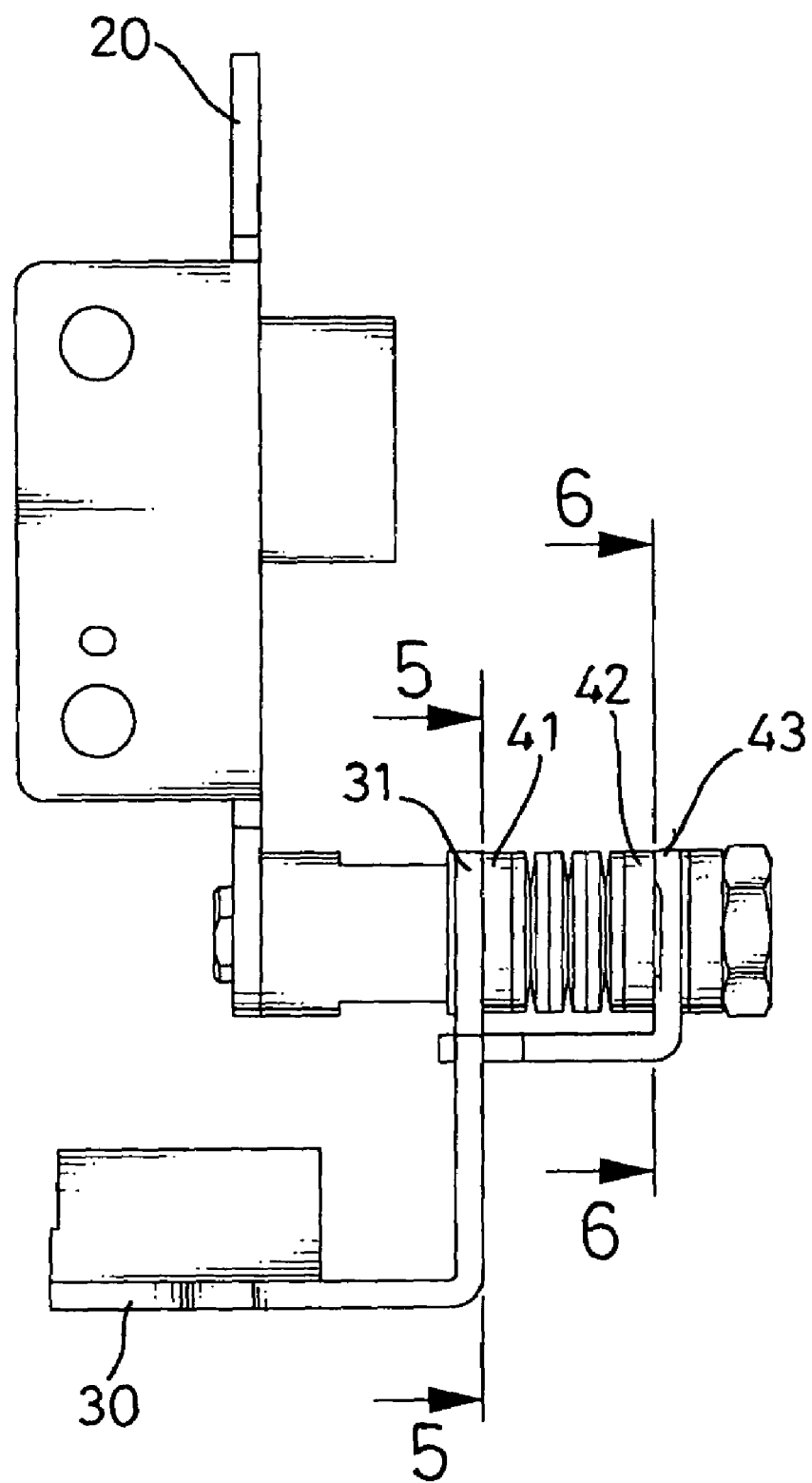
FIG. 4 is a front view of the robust hinge in FIG. 1.
Figure 5:
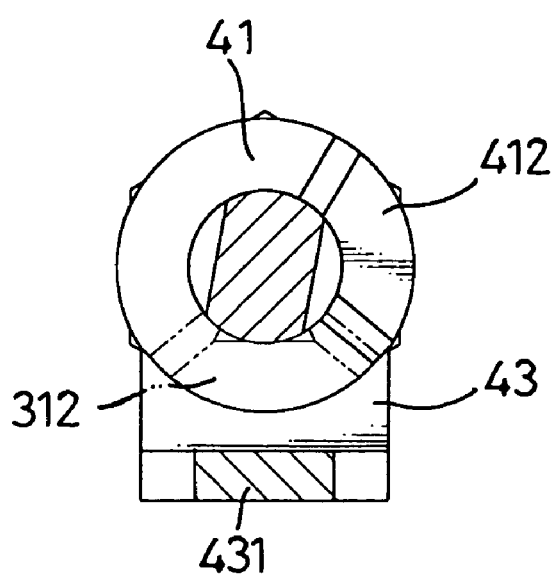
FIG. 5 is a cross sectional side view of the robust hinge along line 5—5 in FIG. 4.
Figure 6:
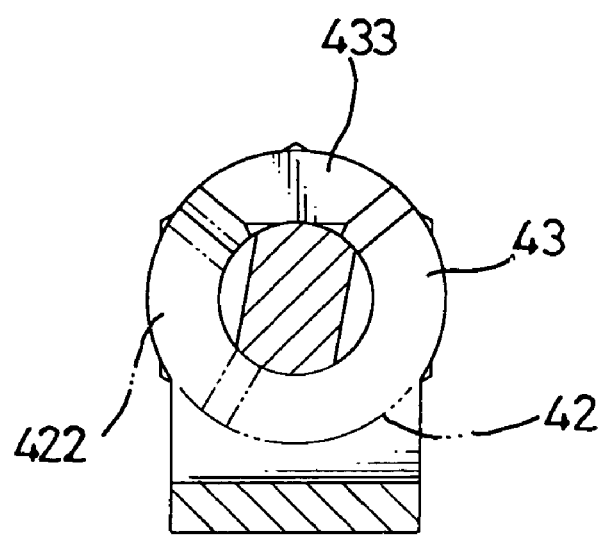
FIG. 6 is a cross sectional side view of the robust hinge along line 6—6 in FIG. 4.

With further reference to FIGS. 4–6, the cover (50) is closed by pivoting the robust hinge. The keyed pivot pin (10) is rotated to rotate the primary and secondary rotating positioning elements (41, 42). When the protrusions (412, 422) on the rotating positioning elements (41, 42) engage and are held respectively in the detents (312, 433) in the stationary positioning elements (31, 43), the cover (50) is kept from hitting the base (60). The engagement of the two pairs of protrusions (412, 422) and detents (312, 433) provide the redundant positioning capability. When one pair of protrusions (412, 422) and detents (312, 433) breaks or wears down by friction, the other pair of protrusions (412, 422) and detents (312, 433) can still provide the positioning capability to keep the cover (50) from hitting the base (60).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A robust hinge comprising
    a keyed pivot pin having
        an outer end;
        an inner end; and
        a thread formed on the inner end of the keyed pivot pin;
    a rotating leaf attached securely to the outer end of the keyed pivot pin and having a through hole attached around the outer end of the keyed pivot pin;
    a stationary leaf mounted around the inner end on the keyed pivot pin and having
        a primary stationary positioning element formed on the stationary leaf and having
            an inside surface;
            a central hole; and
            a detent formed in the inside surface of the primary stationary positioning element around the central hole and having two inclined ends; and
    a spacer assembly mounted around the inner end of the keyed pivot pin and having
        a primary rotating positioning element mounted on the inner end of the keyed pivot pin, rotating with the keyed pivot pin and having
            an outside surface abutting the inside surface of the primary stationary positioning element;
            a central keyhole; and
            a protrusion formed on the outside surface of the primary rotating positioning element around the central keyhole, corresponding to and selectively engaging the detent in the primary stationary positioning element and having two inclined ends;
        a secondary rotating positioning element mounted on inner end of the keyed pivot pin and having
            an inside surface;
            a central keyhole; and
            a protrusion formed on the inside surface of the secondary rotating positioning element around the central keyhole and having two inclined ends;
        a secondary stationary positioning element being L-shaped, attached to the primary stationary positioning element, mounted around the inner end of the keyed pivot pin and having
            a longitudinal leg connected to the primary stationary positioning element and having
                a proximal end connected to the primary stationary positioning element; and
                a distal end; and
            a transverse leg formed on the distal end of the longitudinal leg, mounted around the inner end of the keyed pivot pin and having
                an outside surface abutting the inside surface of the secondary rotating positioning element;
                a central hole; and
                a detent formed in the outside surface of the secondary stationary positioning element around the central hole, corresponding to and selectively engaging the protrusion on the secondary rotating positioning element and having two inclined ends;
        a biasing member mounted around the inner end of the key pivot pin between the primary and secondary rotating positioning elements and having a central hole;
        multiple washers mounted on the inner end of the key pivot pin; and
        a nut screwing onto the thread on the key pivot pin.

2. The robust hinge as claimed in claim 1, wherein the keyed pivot pin has
    a head formed near the outer end of the keyed pivot pin and having a diameter;
    a primary key formed on and extending out of the head to be the inner end and having a diameter wherein the thread is formed on the primary key; and
    a secondary key formed on and extending out of the head to be the outer end and having a diameter wherein the diameter of the head is larger than the diameters of the primary and secondary key;

the through hole in the rotating leaf is non-circular and corresponds to and is mounted securely on the secondary key of the keyed pivot pin;

the stationary leaf is mounted around the primary key of the keyed pivot pin;

the spacer assembly is mounted around the primary key of the keyed pivot pin;

the primary rotating positioning element is mounted on the primary key of the keyed pivot pin;

the secondary rotating positioning element is mounted on the primary key of the keyed pivot pin;

the secondary stationary positioning element is mounted around the primary key of the keyed pivot pin;

the biasing member is mounted around the primary key of the key pivot pin; and the washers are mounted on the primary key of the key pivot pin.

3. The robust hinge as claimed in claim 1, wherein the stationary leaf has a mounting hole formed through the stationary leaf near the detent; and the longitudinal leg of the secondary stationary positioning element further has a mounting tab formed on and protruding longitudinally from the proximal end of the longitudinal leg and mounted in the mounting hole in the primary stationary positioning element.

* * * * *